United States Patent [19]

Erani

[11] Patent Number: 4,512,608
[45] Date of Patent: Apr. 23, 1985

[54] SADDLE ASSEMBLY

[76] Inventor: Homi K. Erani, 318 W. Seneca, Pierre, S. Dak. 57501

[21] Appl. No.: 421,279

[22] Filed: Sep. 22, 1982

Related U.S. Application Data

[63] Continuation-in-part of Ser. No. 365,109, Apr. 5, 1982.

[51] Int. Cl.³ .............................................. B62J 1/00
[52] U.S. Cl. .................................... 297/201; 297/195
[58] Field of Search ............... 297/195, 201, 214, 202, 297/467; 272/73

[56] References Cited

U.S. PATENT DOCUMENTS 4,043,552 8/1977 Kerkonian ..................... 297/195 X
4,387,925 6/1983 Barker et al. ....................... 297/201

FOREIGN PATENT DOCUMENTS 358585 12/1905 France ................................ 297/201
373620 5/1907 France ................................ 297/201
9821 of 1897 United Kingdom ................ 297/201
6734 of 1900 United Kingdom ................ 297/201

Primary Examiner—James T. McCall
Attorney, Agent, or Firm—Banner, Birch, McKie & Beckett

[57] ABSTRACT

A saddle for use with a foot operated device, such as a bicycle, is disclosed. The saddle includes a support member for attachment to the foot operated device, a horn and separate left and right seat members. The support member is formed of a single piece of spring wire bent into a shape including a horn support section, a seat support section and a connecting section. The horn includes separate front and back rollers rotatable independent of one another on the horn support section of the wire. The portion of the wire in the horn support section, which support the rollers, has a free unsupported rear end. The seat members are supported so as to be capable of limited motion in three approximately perpendicular axes.

8 Claims, 8 Drawing Figures

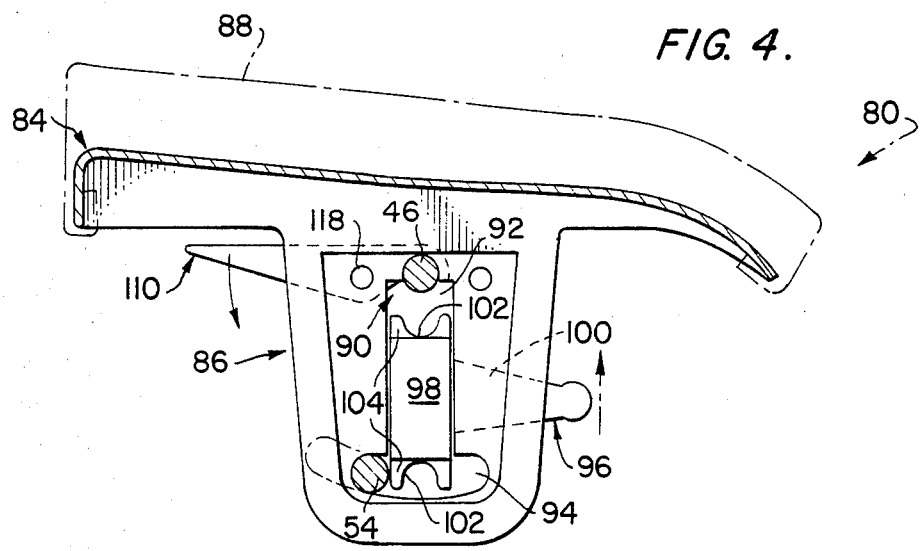
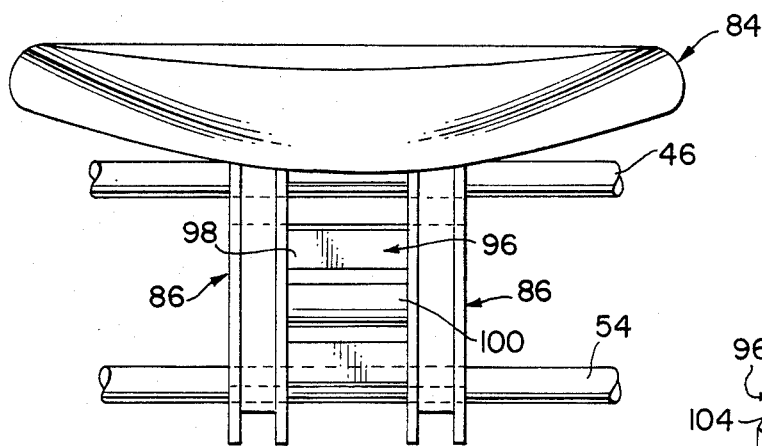
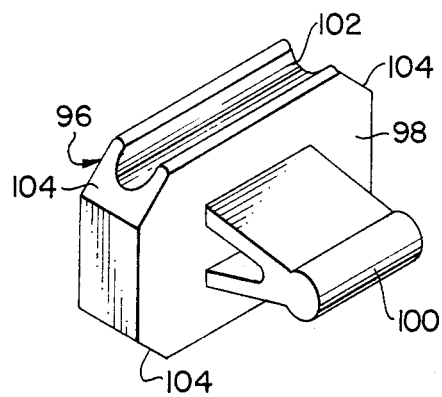
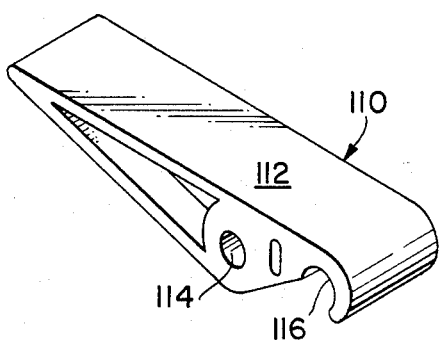
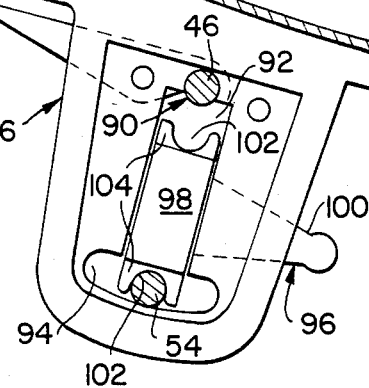

SADDLE ASSEMBLY

The present application is a continuation-in-part application of U.S. patent application Ser. No. 365,109 filed on Apr. 5, 1982.

TECHNICAL FIELD

This invention relates to seats or saddles used for supporting a person or user operating a foot powered device such as a bicycle, tricycle or exercise machine.

BACKGROUND OF THE INVENTION

Numerous types of saddles have been developed for use with foot powered devices. The primary function of the saddle is support of the user. The support should be in a stabilized manner and with a degree of comfort. Typically, a saddle has a seat portion and a horn portion extending longitudinally foward therefrom. The seat portion functions as the primary support for the user of the device and the horn provides stability.

Prior art saddles have varied these two portions in numerous ways in an attempt to achieve a balance of support, comfort and stability. For example, some prior art saddles such as shown in U.S. Pat. Nos. 564,588; 576,070 and 588,039 have eliminated the use of a central horn and merely utilize right and left seat members. U.S. Pat. Nos. 591,330 and 694,865 illustrate bicycle saddles having independent left and right seats in combination with an independent forwardly extending horn. U.S. Pat. No. 618,240 illustrates a bicycle saddle having an independent left and right seats together with a rotatable horn connected to and extending forward from each seat.

It is applicant's belief that none of the prior art saddles has achieved the advantageous balance of support, stability and comfort of the saddle assembly of the present invention.

SUMMARY OF THE INVENTION

The present invention is directed to a saddle and several novel portions of the saddle, such as the horn, the support frame and the seat members. A saddle in accordance with the present invention includes a support member, an elongate horn, and left and right seat members. The support member is adapted to be attached to a foot operated device. The elongated horn extends fore to aft (longitudinally) and is carried by the support member. The horn includes separate forward and rear rollers which are supported by the support member for rotation independent of one another about a longitudinal axis. The left and right seat members are supported by a spring means of the support member. The spring means has a stiff elasticity and supports each seat member in such a manner to allow limited motion about longitudinal and lateral horizontal axes and also about a vertical axis.

In a preferred embodiment of the invention, the horn is supported at its forward end with its rearward end permitted universal motion. This enhances the comfort of the horn because it allows slight left to right and up and down motion while the user is mounting or dismounting the saddle, yet still performs its stabilizing function. Also, by having the rollers of the horn independently rotatable, comfort is again further enhanced because the forward roller, which is adjacent portions of the leg moving a relatively large degree, is free to move without hinderance from the upper thighs of the user, which move to a lesser degree. Friction is thereby reduced.

Also, in a preferred embodiment of the invention, the support member is formed of a single integral piece of spring wire bent into a configuration in which the rollers of the horn are supported on a longitudinal, horizontally extending portion of the wire, and the seat members are supported on vertically spaced, generally horizontal laterally extending portions of the wire. The wire is preferably made of spring steel and its configuration functions as spring to allow only limited motions against its stiff elasticity. It has been found that the limited motion about three approximately mutually perpendicular axes permitted by the spring wire strikes an appropriate balance between comfort and stability such that the seat can faithfully follow the motion of the body of any user of the saddle.

A further feature of the present invention relates to the manner in which the sets themselves are attached to the lateral support wires. Each seat includes a downwardly extending attachment plate having a slot through which the vertically spaced portions of the spring wire can pass. The slots are configured so that the seat can be pivoted about the upper wire to adjust the angle of each seat. A pair of attachment clips are provided for securing the seat to the vertically spaced wires. A first attachment clip sets the angle in which the seat rests, and a second attachment clip frictionally engages one of the wires to prevent the seat from sliding laterally on the wires.

A saddle in accordance with the present invention has the advantages of being comfortable, stable, and readily adjustable.

Various advantages in features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive manner in which there is illustrated and described a preferred embodiment of the invention.

BRIEF DESCRIPTION OF THE DRAWINGS

FIG. 4 is a side view, partially in section, of a seat member;

FIG. 5 is a rear elevational view of the seat member;

FIG. 6 is a side elevational view, partially in section, illustrating the seat member in an alternate position;

FIG. 7 is perspective view of a first attachment clip; and

FIG. 8 is a perspective view of a second attachment clip.

DESCRIPTION OF THE INVENTION

Figure 1:
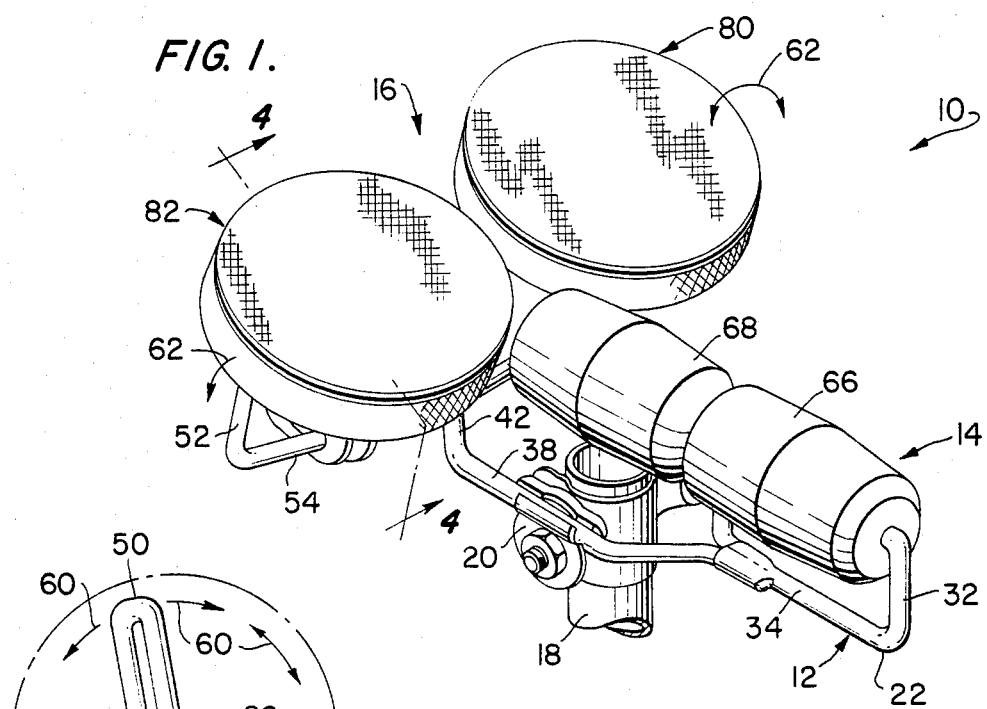
FIG. 1 is a perspective view of a saddle in accordance with the present invention shown attached to a portion of a foot powered device.

Referring to the drawings in detail, wherein like numerals indicate like elements there is shown in FIG. 1 a saddle in accordance with the present invention designated generally as 10. Saddle 10 includes a support member 12, a horn 14 and a seat assembly 16. Support member 12 is attached to an upstanding tube 18 of a foot operated device, such as a bicycle, tricycle or exercise machine, by bolt on clip 20. Other conventional mouting devices could also be used to attach support member 12 to a foot operated exercise device or vehicle.

Figure 2:
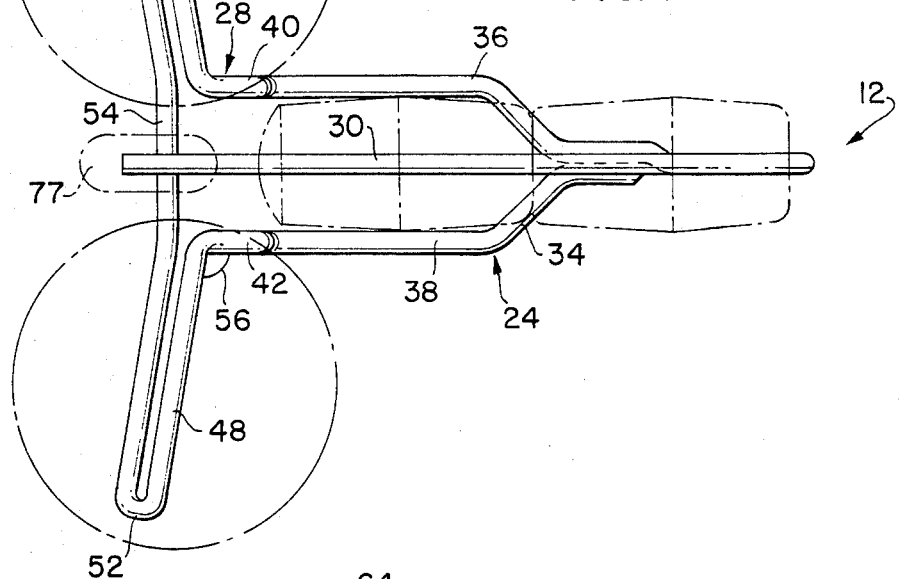
FIG. 2 is a plan view of the wire support member in accordance with the present invention, with other portions of the saddle shown in phantom line.
Figure 3:
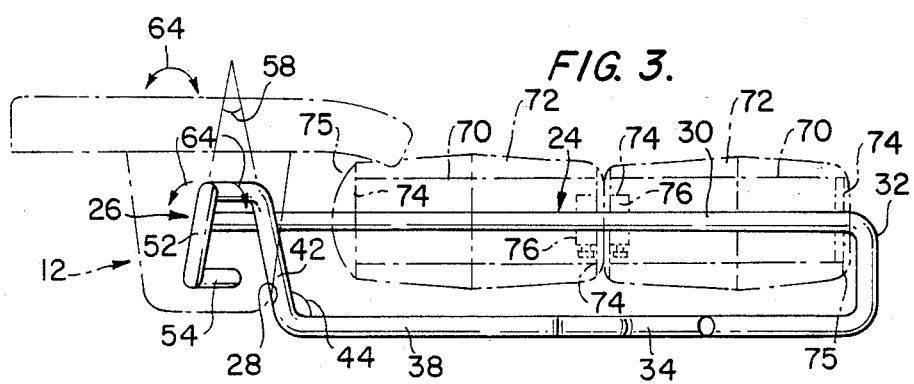
FIG. 3 is a side view of the wire support member of FIG. 2.

Support member 12 is preferably formed of a single integral piece of spring wire 22 capable of being cold formed and bent into the shape illustrated in FIGS. 2 and 3. Wire 22 is bent to form three sections, i.e., a horn section 24, a seat section 26, and a connecting section 28. Horn section 24 includes a horn support portion 30, a front leg portion 32 and a longitudinal support portion 34. Horn support portion 30 extends in a fore to aft longitudinal direction of saddle 10, and has a rearward end which is free and unsupported. A forward end of horn support portion 30 is connected to front leg portion 32 by a downward bend of wire 22. At a lower end of front leg portion 32, wire 22 is bent rearward so that a front end of longitudinal support portion 34 extends rearward therefrom. Approximately midway to seat section 26, wire 22 of longitudinal support portion 34 is bent laterally outward and thereafter, laterally inward to form a left arm 36 of longitudinal support portion 34. Arm 36 includes an outwardly angled portion and a portion parallel with horn support portion 30. A right arm 38 is similarly formed as a forward continuation from connecting section 28 and has an end which is the other end of the wire 22. This other end of wire 22 is preferably attached to the forward area of longitudinal support portion 34 by welding or brazing.

Connecting section 28 includes a rear leg portion 40 extending upward from left arm 36 and another rear leg portion of 42 extending upward from right arm 38. Leg portions 40, 42 extend upwardly from the respective arms 36, 38 at an angle indicated as 44, preferably greater than 90°, for example, 100°. This slope allows connecting section 28 to bend slightly backwards and thus allow seat assembly 16 to pivot slightly about a generally laterally horizontal axis.

Seat section 26 includes left and right seat support portions 46, 48, left and right lateral leg portions 50, 52 and a transverse connecting portion 54. Each seat support portion 46, 48 is bent laterally outward and slightly backward from a respective leg portion 40, 42, preferably at an angle greater than 90°, for example, the illustrated angle 56 of 100°. Left lateral leg portion 50 is bent downward from left seat support portion 46, and right lateral leg portion 52 is bent downward from right seat support portion 48. Lateral leg portions 50, 52 are also angled slightly backward so as to form an acute included angle with rear leg portions 40, 42, for example, the illustrated angle 58 of 20° as seen in FIG. 3. Transverse connecting portion 54 is bent laterally inward from either lateral leg portion 50, 52 to thereby join the two lateral leg portions. The outermost parts of transverse connecting portion 54 are angled slightly inward to approximate the extent of seat support portions 46, 48. A central part of connecting portion 54 is approximately perpendicular to the longitudinal direction of horn section 14 and joins the outermost parts.

The spring wire of seat section 26 and connecting section 28 functions as a spring mechanism of relatively stiff elasticity to allow very limited motion of seat assembly 16 about three generally mutually perpendicular axes. First of all, twisting motion about a generally vertical axis is allowed by the inward and outward motion of seat support portions 46, 48 as shown by arrows 60. This motion occurs because of the bending of support potions 46, 48 and the twisting of leg portions 40, 42, and is limited by the inherent resistance of these portions. This twisting motion is further resisted by transverse connecting portion 54. Motion about a longitudinal horizontal axis is permitted by the flexing or bending downward of seat support portions 46, 48 as shown by arrows 62. This motion is resisted by the inherent stiffness of the seat support portions 46, 48 and by connecting portion 54. Finally, a limited amount of forward and backward motion about a generally transverse horizontal axis is permitted by the motion of seat support portions 46, 48 because of the flexing of leg portions 40, 42 as shown by arrows 64. This last motion is resisted by legs 40, 42 and 50, 52 which are angled toward to one another. In summary, a limited degree of motion is permitted seat assembly 16 about three approximately, mutually perpendicular axis. The permitted motion is not excessive, so that stability is not adversely affected, yet, the motion does contribute to the comfort of saddle 10. This limited degree of motion thus strikes a good balance between comfort and stability and allows the seat assembly to faithfully follow the leg and buttock motions of typical users of saddle 10.

Horn 14 includes separate front and rear rollers 66, 68 respectively. Each roller 66, 68 is formed of a central longitudinally extending tube 70 covered with a cushioning foam material 72. Caps 74 are attached to both ends of tube 70 and have holes through which horn support portion 30 of spring wire 22 pass to rotatably support the roller. Cushioned end pads 75 are attached to each free end of rollers 66, 68 and a bumper pad 77 is attached to the free end of horn support portion 30 to absorb bottoming shocks of the horn. Each roller 66, 68 is held in axial position by an internally located retainer washer 76. Rollers 66, 68 of horn 14 are rotatable independent of one another so that their function of minimizing friction is maximized. For example, if the roller of horn 14 were of one piece, the upper thigh portions of a user's leg, which undergoes less movement than lower portions of the thighs would restrict the rolling motion of the horn. Friction between the thighs and the rollers would occur. However, with roller 66 rotatable independent of roller 68, it is free to rotate because of the more extreme motions of the lower thighs of the user, even though roller 68 must rotate less because of the lesser motion of the upper thigh portion of the legs of the user. While horn 14 is illustrated as comprised of only two independent rollers, it should be understood that horn 14 could be divided into any suitable member of roller sections.

The comfort of horn 14 is also enhanced by having its rear end free to move. Horn support portion 30 functions as a spring because the spring wire 32 tends to return to its central unstressed position, however, it does permit motion away from this position when pressure is applied to horn 14. Thus, when a person sits in a slightly offset position, for example when mounting the foot operated device, horn 14 can bend away from its central position. Even though this motion is permitted, the stability function of horn 14 remains intact because it is fixed to the remainder of the saddle 10 through the front leg portion 32.

Seat assembly 16 includes separate left and right seat members 80, 82 respectively. Seat members 80, 82 are of like construction, and hence, only one seat member 80 is illustrated in detail in FIGS. 4, 5 and 6.

Seat member 80 includes a contoured seat 84 and a pair of attachment plates 86. Seat 84 is shaped or contoured to comfortably support the buttock of a user. Attachment plates 86 extend downwardly from the bottom surface of seat 84. Seat 84 and attachment plates 86 are preferably formed of a single piece of material such as a glass fiber filled plastic. If desired, a cushioning pad 88 can be attached to seat 84.

Attachment plates 86 have a slot 90 in the general configuration of an inverted T with a vertically extending portion 92 and a horizontally extending base 94. The upper end of portion 92 is curved to match the contour of seat support portion 46 of wire 22. Seat member 80 is attached to support member 12 by sliding seat support portion 46 through vertically extending portion 92 of slot 90 and transverse connecting portion 54 through base 94 of slot 90.

The angle at which seat member 80 is positioned can be adjusted by pivoting seat member 80 about seat support portion 46 and thus positioning transverse connecting portion 54 in one of three positions within base 94 of slot 90. Transverse connecting portion 54 can be positioned at either extreme end of base 94 or in its center.

A first attachment clip 96 is provided for securing seat assembly 80 at a desired angle by holding transverse connecting portion 54 in one of the three positions. Clip 96 includes a body 98 and a handle 100, preferably formed of an integral piece of plastic material. Body 98 has a groove 102 formed along opposite longitudinal edges. Each groove 102 is contoured to match the outer surface of wire 22. Only one groove 102 is used at any given time with the other groove capable for use should the first groove become damaged. Body 98 also has beveled side edges 104 adjacent either side of each groove 102 to aid in inserting clip 96 between attachment plates 86. Handle 100 extends away from one of the major surfaces of body 98.

As seen in FIG. 5, attachment plates 86 extend downwardly from seat 84 in a spaced parallel relationship. The spacing between attachment plates 86 is such that the sides of body 98 of clip 96 will be received within a slot 90 of each attachment plate 86. The width of vertical portion 92 of slot 90 and the thickness of body 98 are such that body 98 is slidable upwardly and downwardly within vertical portion 92. To insert clip 96 within slot 90, handle 100 is gripped and beveled edges 104 are used to force attachment plates 86 outwardly and allow the side edges of body 98 to slip within vertical portion 92. Thereafter, connecting portion 54 is placed in its desired position and clip 96 is slid downwardly to hold it in the desired position. For example, in FIG. 4, connecting portion 54 is shown in the leftmost position of base 94 and is held therein by clip 96. In FIG. 6 connecting portion 54 is shown in the central position of base 94 and is held therein by groove 102 of clip 96.

A second attachment clip 110 is provided to prevent seat 80 from sliding laterally along portions 46, 54 of wire 22. Attachment clip 110 is comprised of a elongated body 112 having a pivot hole 114 and an engagement groove 116. Attachment 110 is connected to seat member 80 by a roll pin 118 passing through pivot hole 114 and attached to attachment plates 86. The spacing between pivot hole 114 and the surface of groove 116 closest to it is slightly greater than the spacing between pivot hole 114 and the closest surface of seat support portion 46. In this manner, groove 116 frictionally engages wire 22 of seat support portion 46 to prevent the lateral sliding of seat member 80. To adjust the lateral position of seat member 80, groove 116 is moved out of engagement with portion 46 by pivoting about pin 118. Clips 96 and 110 allow the angular and lateral position of seat member 80 to be readily and easily adjusted on support member 12.

Vertical and horizontal dispositions or directions have been specified herein and in the claims, however, such designations are for purposes of referencing various parts of the saddle with respect to one another and should not be considered as limiting the parts of the present invention to precise horizontal and vertical dispositions. Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principal of the invention, to the full extent indicated by the broad general meaning of the terms in which the appended claims are expressed.

What is claimed is:

1. In a saddle for a foot operated device, a horn assembly comprising a elongate horn extending fore to aft of the saddle and means for supporting said horn for rotary motion about an axis extending generally fore to aft, said horn including discrete rollers each independently rotatable on said support means and each located at different fore to aft positions whereby a forward one of said discrete rollers would be free to rotate independent of a rearward one of said discrete rollers.

2. The horn assembly of claim 1 wherein said support means supports said horn adjacent its forward end and allows its rearward end universal motion.

3. The horn assembly of claim 1 wherein said support means includes a single elongate member extending generally fore to aft with said discrete rollers being mounted thereon one behind the other.

4. A saddle for use with a foot operated device comprising:
 a support member for attachment to the foot operated device;
 an elongate horn extending for to aft and carried by said support member, said horn including separate forward and rear rollers supported by said support member for rotation independent of one another about a longitudinal axis; and
 left and right seat members, said support member including spring means having stiff elasticity for supporting each seat member to allow limited motion about longitudinal and lateral horizontal axes and a vertical axis.

5. The saddle of claim 4 wherein said spring means is comprised of spring wire having a generally horizontally extending seat support portion for each seat member and a leg portion extending downwardly from the inner end of said seat support portions whereby said seat support portions can twist about the leg portions to allow motion about the vertical axis, can bend downwardly to allow motion about a longitudinal horizontal axis and said leg portion can flex forward and backward to allow said seat support portions to move about a lateral horizontal axis.

6. The saddle of claim 5 wherein said spring means further includes spring wire having a lateral leg extending from each seat support portion and a transverse connecting portion extending between said lateral legs to stiffen the elasticity of said spring means.

7. The saddle of claim 6 wherein the spring wire of said seat support portions, said leg portions, said lateral legs and said transverse connecting portion is formed of a single piece of material.

8. The saddle of claim 7 wherein the portion of said saddle supporting said rollers is a portion of said single piece of spring wire material.

* * * * *